United States Patent [19]

Reinhardt

[11] 4,431,289

[45] Feb. 14, 1984

[54] PANORAMIC CAMERA

[76] Inventor: Kurt A. Reinhardt, 971 Monserate Ave., Chula Vista, Calif. 92011

[21] Appl. No.: 272,135

[22] Filed: Jun. 10, 1981

[51] Int. Cl.³ .............................................. G03B 37/02
[52] U.S. Cl. ...................................................... 354/96
[58] Field of Search ..................... 354/94–96, 354/98, 99, 81, 293, 294

[56] References Cited

U.S. PATENT DOCUMENTS

| | | | |
|---|---|---|---|
| 2,764,073 | 9/1956 | Liu | 354/96 |
| 2,782,699 | 2/1957 | Vanderhooft | 354/96 |
| 2,815,701 | 12/1957 | Back et al. | 354/98 |
| 2,926,561 | 3/1960 | Keeble | 354/96 X |
| 3,185,057 | 5/1965 | Hearon et al. | 354/96 X |
| 3,387,194 | 6/1968 | Banks | 307/50 X |

FOREIGN PATENT DOCUMENTS

| | | | |
|---|---|---|---|
| 246188 | 9/1960 | Australia | 354/98 |
| 796326 | 4/1936 | France | 354/98 |
| 428003 | 5/1935 | United Kingdom | 354/293 |

*Primary Examiner*—John Gonzales
*Attorney, Agent, or Firm*—Charmasson, Branscomb & Holz

[57] ABSTRACT

A panoramic camera utilizes a rotating drum to mount the lens and front and rear vertical slits defined by the drum pass a narrow band of light through the lens and onto a cylindrically formed film sheet held at the rear of the drum by a frame. A small DC reversible electric motor drives the drum through friction wheels rather than gears to avoid play and backlash, and sweeps the drum through its exposure cycle, immediately upon the termination of which it reverses direction to return to the starting position.

8 Claims, 20 Drawing Figures

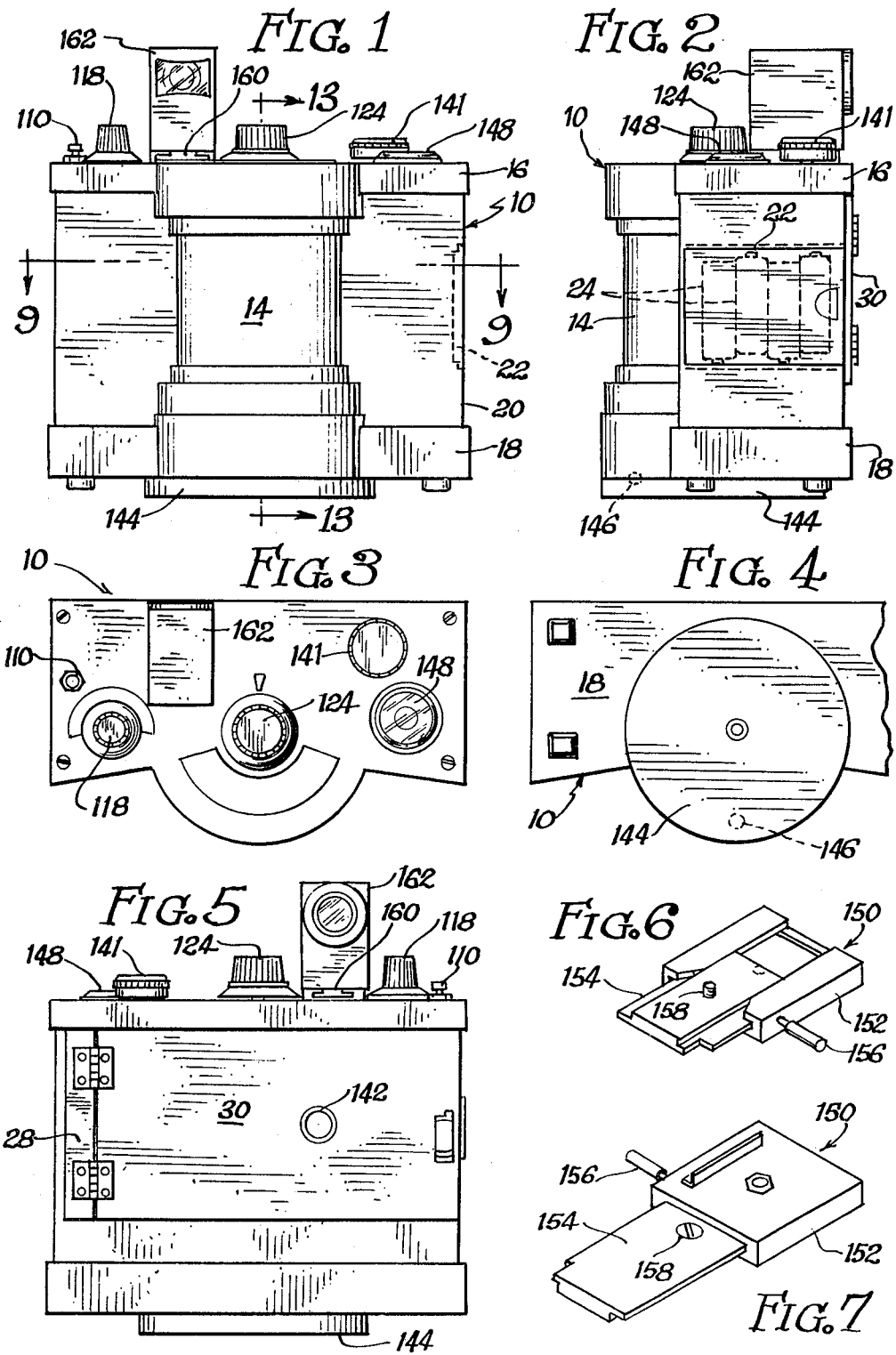

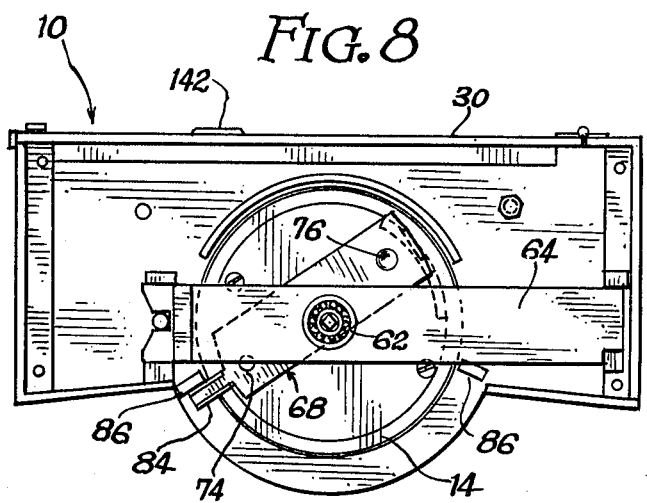
FIG. 8
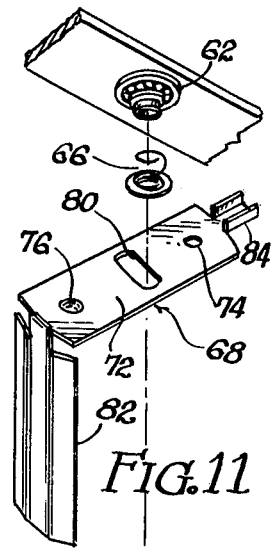
FIG. 11
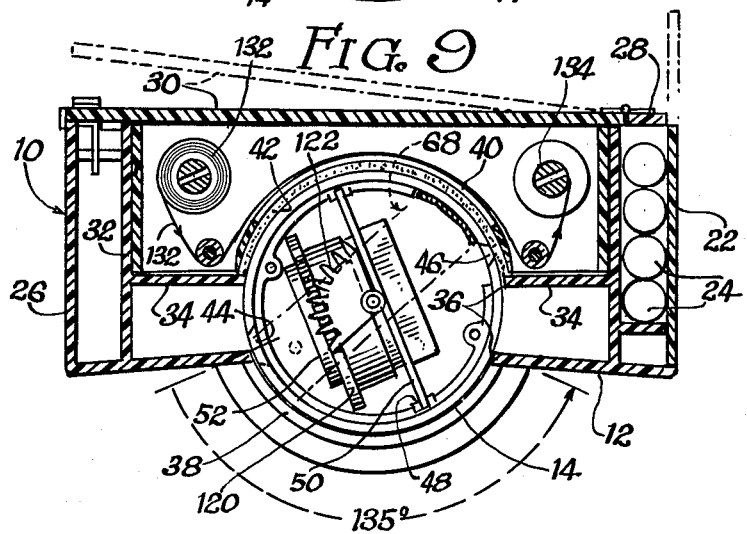
FIG. 9
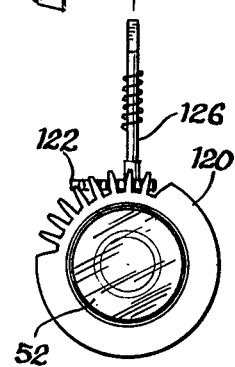
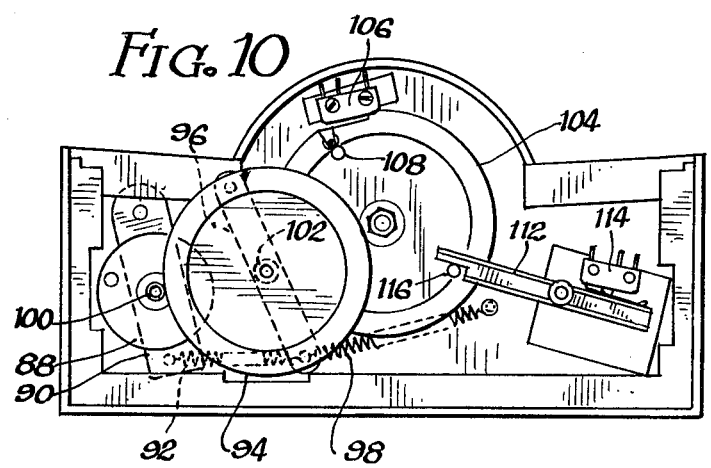
FIG. 10
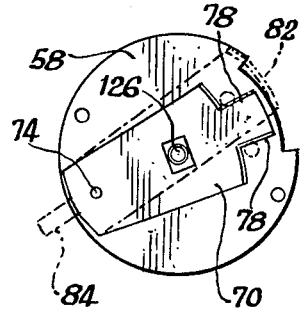
FIG. 12

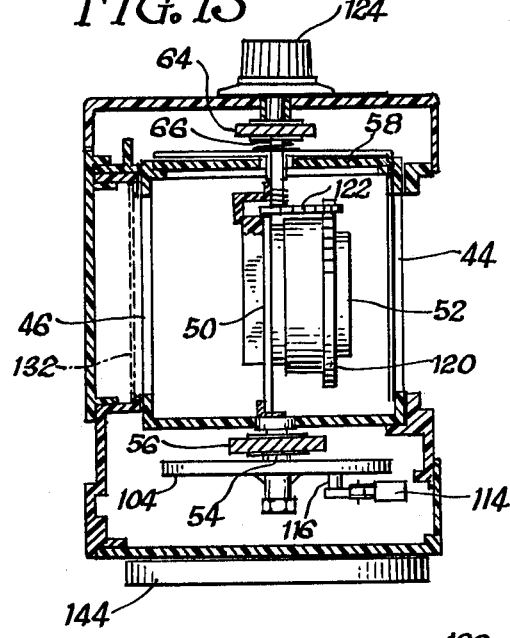

4,431,289

PANORAMIC CAMERA

BACKGROUND OF THE INVENTION

A panoramic photograph can be enormously more revealing than a regular non-panoramic photograph in quite a high proportion of photographic situations. Because many photographed scenes stretch horizontally, a panoramic photograph can capture the required background and the environment of the central theme without the commensurate reduction in photograph size which would occur if the same picture range were encompassed twodimensionally with a lens change.

Panoramic cameras require a somewhat different geometrical approach than do conventional cameras because, short of using an extremely expensive lens, a spherical lens must be made to sweep through the angle of the panorama. The sweeping action must be smooth and unhalting, and the camera ordinarily must be mounted so that it remains more stable than is necessary for the taking of a conventional picture.

Panoramic cameras in the past have utilized complicated gearing mechanisms driven by a wind-up escapement, or in some cases, motors. The intricacy and expense of some of these arrangements is prohibitive to the non-professional photographer, and the utilization of gears creates the built-in characteristics of gear lash with age, and some vibration as the gears mesh. Any vibration is, of course, the anathema of clear photography and especially in panoramic photography due to the duration of the exposure.

There is a need, therefore, for a simple, gearless, smoothly functioning panoramic camera than can be produced inexpensively and marketed as a high-quality product to amateur and professional photographers both.

SUMMARY OF THE INVENTION

The present invention fulfills the above stated need and comprises a simply constructed motor-driven camera with gearless drive wheels that produce a smooth, uninterrupted and nonvibrational drive and return of the central shutter drum that results in a virtually perfect photograph.

The unit comprises a housing which defines an upright cylindrical chamber in which rotates a coaxial shutter drum. The drum mounts a lens and passes a slit of light from a front slit through the lens and through a rear slit onto a strip of film held in a cylindrical shape by a film frame which fits into the housing just behind the drum. The drum has a shutter mounted on a pivotal arm which automatically clears and covers the rear slit as the drum is swept first through its exposure sweep and immediately returned back to its starting position.

The exposure sweep and the return sweep of the drum are effected by a reversible, variable speed DC motor mounted in the housing which drives the drum through a frictionally surfaced reduction wheel so that no gears are used. Speed control and reverse of the motor to return the drum are all effected electrically so that no complicated gear shifts or wheel interchanges are required. Speed changes are made through the simple expedient of adding or subtracting 1.5 volt batteries to the power source, and drum reversal to return the drum to its starting position is achieved by a limit switch which simply reverses the polarity of the current supplied to the motor.

BRIEF DESCRIPTION OF THE DRAWINGS

FIG. 1 is a front elevation view of the camera;

FIG. 2 is an elevation view from the right side of the camera shown in FIG. 1 with the battery cover removed;

FIG. 3 is a top elevation view of the camera;

FIG. 4 is a bottom elevation view of the camera with the tripod mount in place;

FIG. 5 is a rear elevation view of the camera with the progressive photograph mount in position;

FIG. 6 is a perspective view of a quickly removeable tripod mount;

FIG. 7 is a perspective of the underside of the mount of FIG. 6;

FIG. 8 is a top elevation view of the camera with the top cover removed;

FIG. 9 is a section taken through line 9—9 of FIG. 1;

FIG. 10 is a bottom elevation view of the camera with the bottom cover removed;

FIG. 11 is an exploded perspective view of the shutter mechanism and diaphragm adjust;

FIG. 12 is a diagrammatic view illustrating the shutter action;

FIG. 13 is a section taken along line 13—13 of FIG. 1.

FIG. 14 is a perspective of the drum removed from the camera;

FIG. 15 is a top elevation view of the film holding frame;

FIG. 16 is a section taken along line 16—16 of FIG. 15;

FIG. 17 is a section taken through the left end of the film support frame; and

FIG. 18 is a schematic diagram of the operational circuit.

Figure 19:
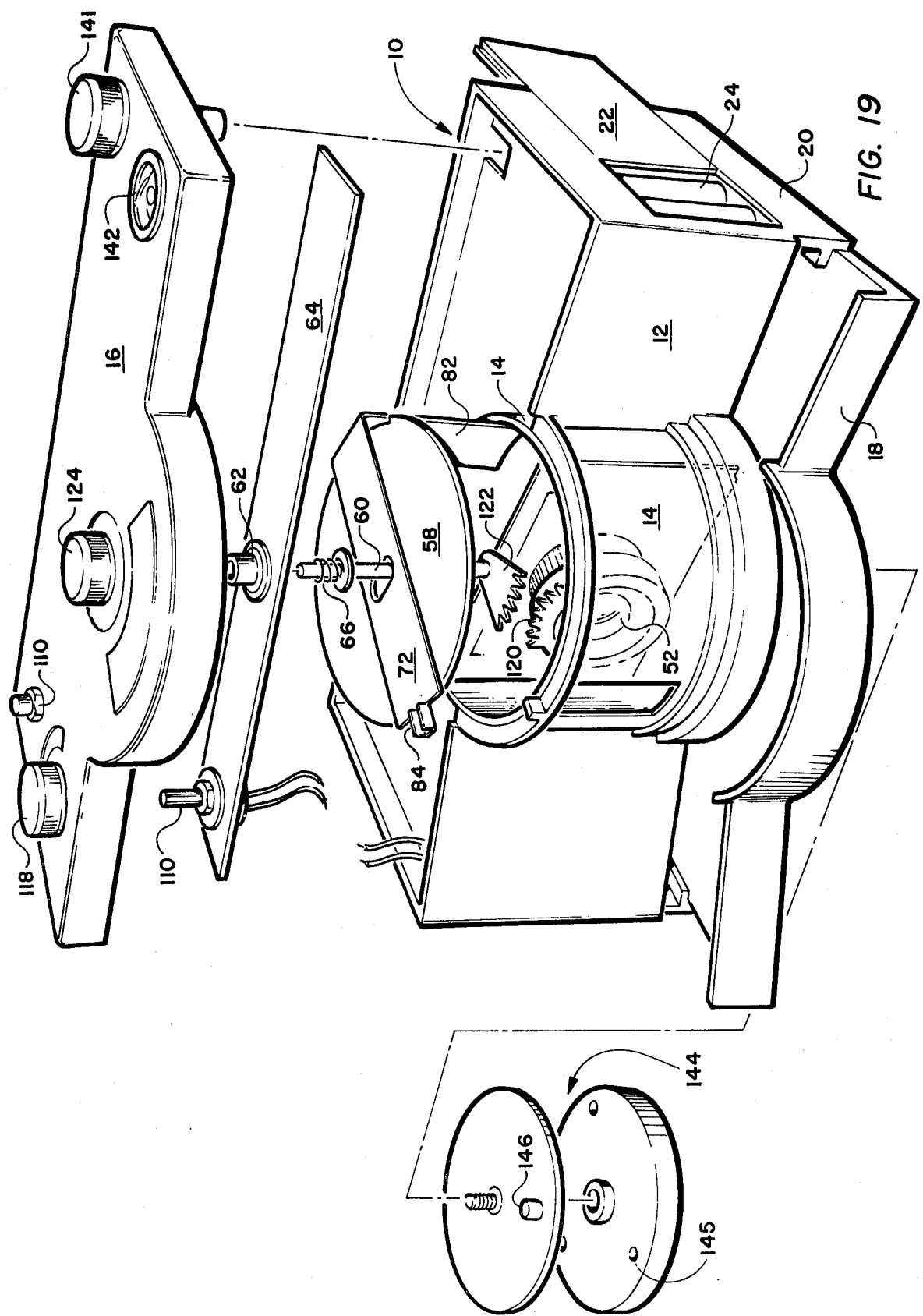
FIGS. 19 and 20 are exploded perspectives from above and below the camera, respectively.
Figure 20:
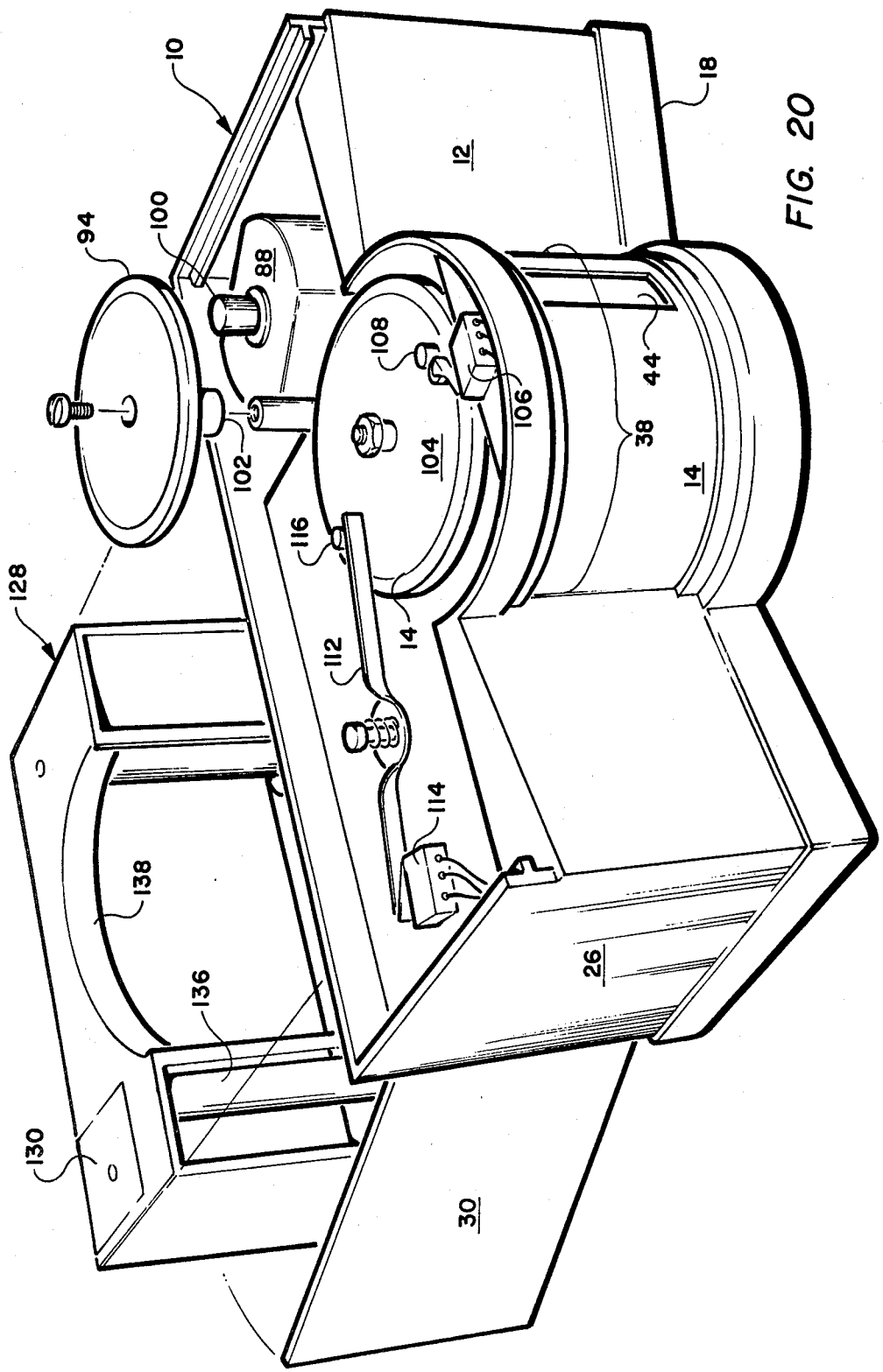

These figures were drawn by an illustrator for the sole purpose of facilitating a quick understanding of the assembly of the parts and spatial relationships. These figures may vary in some details from FIGS. 1–18. In the event such discrepancies are noted, all structure should be taken from FIGS. 1-18, which are technically complete, and not internally contradictory with FIGS. 19 and 20 being overridden and referred to only to gain a quick overview of the general assembly of the camera.

DETAILED DESCRIPTION OF THE PREFERRED EMBODIMENT

The overall appearance of the camera is illustrated in FIG. 1 wherein an external housing 10 comprises a front wall 12, which bows centrally at top and bottom to accomodate the rotary drum 14. The front wall is covered top and bottom with top cover 16 and bottom cover 18, both of which are removeable for maintenance by virtue of being screw-mounted.

The housing also includes a left (from the camera's perspective) sidewall 20, which has a battery access panel 22 therein, which covers battery pack 24, all shown in FIG. 2. The right side panel 26 has no openings, and the last portion of the housing is covered by the back sidewall 28, the greater portion of which is defined by the hinged film access door 30.

The interior structure of the housing as can be seen in FIG. 9 includes a pair of side baffles 32 and internal baffles 34. The internal baffles 34, together with the front wall 12, define a cylindrical chamber 36, at least in the geometrical sense. Although most of this chamber is really open, it is convenient to define it so it can be referred to as it relates to the central drum and other parts of the apparatus.

The central chamber defines a wide front aperture 38 and a rear opening 40, bordered by felt blinds 42 extending rearwardly from the internal baffles 34 to ride on the surface of the rotating drum 14 to eliminate light leakage.

Turning to FIGS. 13 and 14, the rotating shutter drum 14 has a wide front exposure slit 44 and a narrower slit 46. The drum also has a pair of vertical tracks 48, best seen in FIG. 9, which seat a lens-holding plate 50 which mounts the lens 52. The relationship of the slits to the lens is such that the slits are bisected by the lens optical axis.

The drum is pivoted on a vertical axis which passes through the optical center of the lens. The axis is defined by a lower axle shaft 54 which is rotationally mounted in a ball bearing seat in crossbar 56. At the top of the drum a removeable lid 58 defines a second upright axle shaft 60 which is journalled in bearings 62 shown in FIG. 8 which are mounted in crossbar 64. A stabilizing spring 66 is used to hold the drum in place.

The drum is thus freely rotational within the cylindrical chamber 36, and in operation, which will be detailed below, the drum rotates as shown in FIG. 9 from the position in which the front slit 44 is adjacent the left edge of the aperture 38 all the way across the aperture until it is adjacent the right side, and then back to the starting position. During this action, a shutter mechanism 68, mounted on top of the drum and shown in FIGS. 11, 12, 13 and 14, is operative to clear the rear slit 46 during the exposure sweep and to cover it during the return stroke. The shutter mechanism is mounted on top a thin bearing plate 70 and includes an arm 72 pivoted at 74 and having a dimple 76 which will snap on either side of the tab 78 of the bearing plate 70 to define two distinct positions. A slot 80 accommodates the shaft 60 and also defines the limits of movement of the arm, and the depending shutter element 82 moves between the clear position shown in FIG. 9 to a position blocking the slit. This is accomplished automatically by the striking of the tab 84 on properly positioned trips which can be seen in FIG. 8.

Thus it can be seen that the drum will rotate freely on its axis, and when rotated through the sweep and return strokes will automatically open and close the shutter during the respective strokes. The mechanism which drives the drum is shown best in FIG. 10, and is rather simple, which represents one of the advantages of the instant invention. The motor is shown at 88. It mounts on a pivotal arm 90 which is springbiased by spring 92 against a reduction wheel 94, also mounted on a swing arm 96 biased by spring 98. The motor has a small power wheel 100 which drives the rim of the reduction wheel 94. Both of these wheel have a rubbery, frictional edge. A small wheel 102 is integral and coaxial with the larger wheel 94, and this wheel drives a large rubber wheel 104 mounted on the drum shaft 60.

Thus the motor 88 is in constant driving contact with the drum, and no means is provided for clutching, disengaging, or reversing the drive mechanism mechanically.

Actual operation of the drive system is easily understood by making simultaneous reference to FIGS. 10 and 18. Basically, motor 88 is a variable speed and reversable motor, and the return sweep is achieved by a polarity reversal.

Switch 106 is a normally closed switch which is opened upon contact of the trip 108. In FIG. 10, the switch is opened, and the motor is not operating. The starting switch takes the form of a button switch 110 on top of the camera housing, visible in FIGS. 1 and 5. As can be seen in the schematic in FIG. 18, closing this switch bypasses the now opened switch 106, operating the motor and moving the trip 108 off of the switch 106, thereby causing it to close as indicated in FIG. 18. The button switch 110 can now be released, and the motor will continue to turn because of the closure of switch 106.

As the motor continues to operate and the drum rotates, trip 108 strikes lever arm 112, actuating polarity reversal switch 114. This switch is actually a unistable switch which has been rendered bistable by the incorporation of the lever arm 112, which is slightly frictional and provided with a counteracting spring about its pivot point to neutralize the weak spring of the switch 114. Thus, the lever arm will remain, and cause the switch to remain, in either position upon initially being set there.

The motor 88 has an instant response time, and the other moving mechanism is sufficiently lightweight that reversal time is minimal. The drum thus begins its return sweep, and upon reaching the starting position, a second trip 116 reverses the switch 114, putting it in its exposure sweep direction, and simultaneously switch 106 is caused to open, terminating further motion. The cycle is thus complete.

Turning to certain other features of the circuitry, it will be noted that a very simple mechanism is used for speed variation. This comprises selecting the combination of one, two or four batteries in series, to vary the speed of the variable speed motor 88. A selector switch 118 mounted on top of the camera housing permits this election. This simple expedient avoids power loss that would occur in a rheostat. Additionally, it should be noted that when the switch 114 reverses polarity for the return sweep from the limit position, power is drawn from the upper two batteries of the battery pack, which serves two purposes. By the direct, un-switched drive of the return sweep, return speed is constant regardless of the setting of the exposure sweep selector speed switch 118. Also, those batteries of the four-battery pack which are least used, because they are idle during low speed operation, are used more, evening out the battery life. As the two upper batteries return the drum from its limit position, motion is stopped not by opening the switch 106, which is no longer effective, but is stopped automatically by the reversal of switch 114 after switch 106 has been opened. This eliminates any necessity for the exact positioning of the trips 108 and 116 to simultaneously actuate their respective switches. One more switch, indicated at 120, is a remote operation switch, and duplicates the function of switch 110.

Although a variation of sweep speed compensates for different light conditions to a certain extent, obviously the exposure level must be capable of finer selection. The lens 52 which is used incorporates a built-in diaphragm operable by rotating the rim 120, which has been modified to engage the spur 122 which is operated by knob 124 on the diaphragm adjustment shaft 126. This knob rotates with the drum rather than remaining stationary with the camera housing during the sweep and return cycle.

The film is held in place on a cartridge-style film frame 128 detailed in FIGS. 15 through 17. The frame has a pair of doors 130 which open to engage in rotating relation the film roller 132 and takeup spool 134, shown in FIG. 9. The film passes around roller guides 136, behind arcuate guidways 138 which have black felt-lined fronts 140 which ride on the drum surface. The frame fits snugly into position behind the baffles 34 and is retained in place by the door 30. A small knob can be used to rotate the film, and the positioning of the film for the next exposure can be gauged by the view window 142, which has an internal black tube terminating in an oblique red window adjacent the number line on the back of 120 film.

The camera disclosed has a sweep of about 135°. In some instances it might be nice to be able to take a complete 360° panoramic shot. To accommodate this, a base 144 mounts to the bottom of the housing and defines three equally angularly spaced dimples 145 which are selectively engaged by a spring loaded detent 146 which extends down through the bottom panel 18 of the housing. A central threaded hole in the base enables it to be engaged on a tripod, and once on the tripod, three consecutive photographs can be taken at the three 120° intervals, producing three negatives that overlap slightly and can be developed and cut to create a perfect, continuous panorama. Since ordinarily a panoramic shot is taken horizontally, a bidimensional or X—Y level 148 is mounted atop the camera housing.

A quick-release mount 150 may be used to allow the rapid removal and re-mounting of the camera. This device has a base member 152 which is adapted to fit on a standard tripod, and a slide 154, retained in place in the base member by means of a detent 156. A central bolt end 158 engages in the central hole in the base 144, interposing the quick release unit between the rotating base and the tripod.

On the top of the housing is a sliding mount 160 for a sight 162.

The invention offers an extremely simple, reliable and high-quality means of making panoramic photographs, and will undoubtedly be a welcome addition in a field of complexity and high expense.

While I have described the preferred embodiment of the invention, other embodiments may be devised and different uses may be achieved without departing from the spirit and scope of the appended claims.

What is claimed is:

1. A panoramic camera comprising:
   (a) a housing defining a cylindrical chamber;
   (b) said chamber having a frontal wide angle aperture and an angularly wide rear opening;
   (c) means for holding a film strip shaped as a portion of a cylinder across said opening;
   (d) a rotating drum coaxially mounted in said cylinder;
   (e) an upright lens mounted in said drum;
   (f) a front slit and a rear slit defined in said drum parallel to the drum axis, to the front and rear of, respectively, and spanning the axis of, said lens;
   (g) means for rotating said drum in said chamber to sweep a band of light across a film strip held at said opening; and,
   (h) said drum having a starting position and a fully swept limit position, and said means to rotate said drum comprising an electric motor and including an automatic control means for said motor so that same first rotates said drum in an exposure sweep from said starting position to said limit position, and then returns said drum to the starting position during a return sweep.

2. Structure according to claim 1 and including a shutter alternately moveable between a clear mode and a covered mode to clear and cover said rear slit during said exposure and return sweeps, respectively, and including means to move said shutter between said modes defining a shutter-mounting arm pivoted to said drum, and a pair of trip elements mounted in said housing to alternately pivot said arm to move said shutter by sliding it in an arc between said clear and cover modes when said drum approaches the starting and limit positions, respectively.

3. Structure according to claim 1 wherein said motor is powered by a DC power supply and is reversable, and including a polarity reversing limit switch mounted in said housing and actuated by a trip mounted on said drum when same reaches said limit position.

4. Structure according to claim 3 wherein said drum mounts a second limit switch trip to again reverse the polarity of said motor as said drum approaches the starting position during the return sweep.

5. Structure according to claim 4 and including a normally closed interrupting switch disposed in series in the power circuit of said motor, and including a trip on said drum to open said switch when said drum is in the starting position, and including a starting switch wired to bypass the interrupting switch so that the latter will be closed by rotation of said drum out of the starting position.

6. Structure according to claim 1 wherein said motor drives said drum through a gearless drive both through its exposure and return cycles so that said camera is entirely gear-free.

7. Structure according to claim 6 wherein said gearless drive comprises a reduction wheel having a coaxial large and small wheel engaging respectively a power wheel on the shaft of said motor and a coaxial drive wheel on said drum, said wheels all having frictional interengaging rims and means biasing same together.

8. Structure according to claim 1 wherein said aperature spans more than a certain angle, said exposure sweep passes through at least said certain angle, and said camera includes an adjustable base adjustable about an axis substantially coincident with the axis of said drum and having detent points angularly spaced apart at intervals of said certain angle to permit making continuous or overlapping sequential panoramic exposures.

* * * * *